Patented Aug. 12, 1930

1,772,753

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

PRESERVATION OF LATEX

No Drawing.   Application filed April 16, 1929.   Serial No. 355,678.

This invention relates to methods of preserving latex of rubber or similar material, and particularly by means of salts of selenious and tellurous acids. It also relates to the products thereof.

In general, materials that are used for preserving latex fall into one of the following classes. Those that have definite anti-coagulating properties; those that have definite antiseptic or germicidal properties; and those that have combined properties of preventing coagulation and putrefaction, one of the two properties being predominant. Ammonia and formaldehyde are best known; the former belongs to the first named class but also retards putrefaction under certain conditions, and the latter gives preserving action without much increased stability and requires careful procedure to prevent coagulation.

It has now been found that the soluble salts of selenious and tellurous acids, such as the alkali-metal salts, are effective especially from the standpoint of coagulation, and when added to latex in small amounts protect the latex against coagulation over a substantial period of time. 1 part of the salt to 1000 parts of latex will preserve latex over a period of three months.

It is to be understood that the above proportion is not limiting, that varying proportions of small amounts of the described salts may be used, and it is not desired to limit the invention otherwise than as set forth in the appended claims.

Having thus described my invention, what I claim and desire to protect by Letters Patent is:

1. The method of preserving latex which comprises adding to latex a small amount of a soluble salt of an acid having the formula $H_2XO_3$ where X represents selenium or tellurium.

2. The method of preserving latex which comprises adding to latex a small amount of an alkali-metal salt of an acid having the formula $H_2XO_3$ where X represents selenium or tellurium.

3. As a new material latex containing a small amount of a soluble salt of an acid having the formula $H_2XO_3$ where X represents selenium or tellurium.

4. As a new material latex containing a small amount of an alkali metal salt of an acid having the formula $H_2XO_3$ where X represents selenium or tellrium.

Signed at Passaic, county of Passaic, State of New Jersey, this 12th day of April, 1929.

JOHN McGAVACK.